July 18, 1944.  E. B. MAILLART  2,353,682
FILTER GLASS HOLDER
Filed Oct. 2, 1942
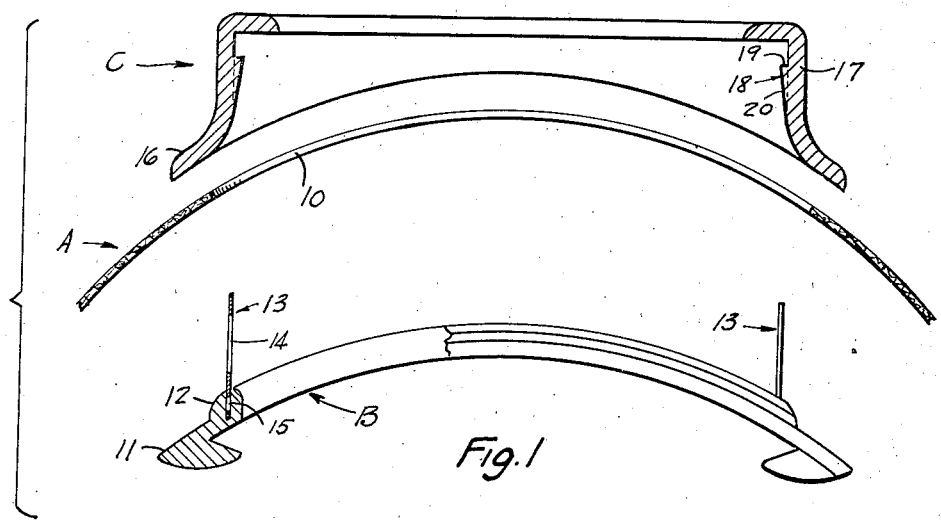
Fig. 1
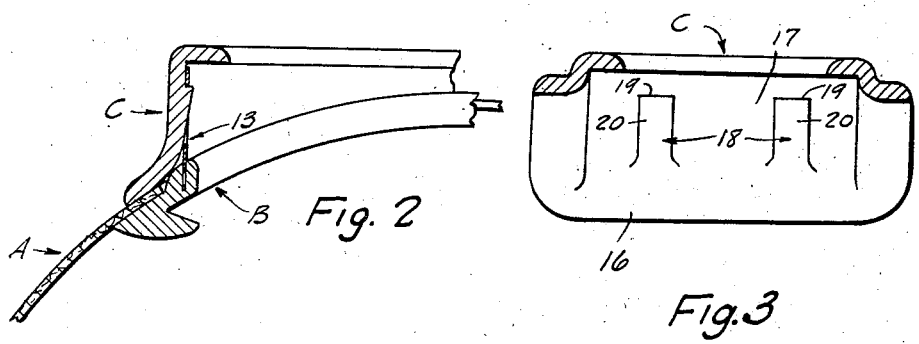
Fig. 2
Fig. 3
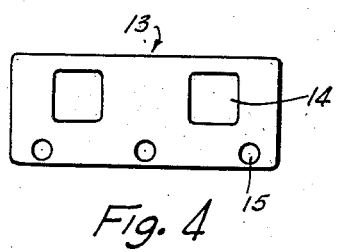
Fig. 4
INVENTOR.
Edmond B. Maillart.
BY Joshua R. H. Potts Patented July 18, 1944

2,353,682

UNITED STATES PATENT OFFICE 2,353,682

FILTER GLASS HOLDER

Edmond B. Maillart, Media, Pa., assignor to Frederick M. Bowers, Chester, Pa.

Application October 2, 1942, Serial No. 460,543

6 Claims. (Cl. 2—8)

This invention relates to filter glass holders, such as are commonly employed in welding helmets, and is concerned primarily with the structure of the holder which provides the connection with the helmet.

A welding helmet ordinarily includes a mask or shield which is made from some good insulating material such as a fibre composition. This mask is formed with a window opening for vision purposes. Filter glass holders are associated with these window openings and serve to position the ray filters and associated protective glasses.

The desirability of simplifying the assembly of the holders with the masks has long been recognized by those skilled in this art. Patent No. 2,260,849 issued to Frederick M. Bowers discloses a filter glass construction which is highly simplified and which is susceptible of assembly with the welding shield with great ease and no unduly complex operations. However, the holder of this patent is characterized by the inclusion of an exteriorly protruding or outer part that is made of metal. Under present day war conditions the availability of metals has greatly diminished and it is, of course, desirable to substantially eliminate the metallic parts wherever possible.

Accordingly, this invention has in view, as an important object, the provision of a filter glass holder of the type described in the above identified Bowers patent and in which all of the major elements are made from non-metallic substances. In carrying out this idea the outer or protruding part of the holder is made from an insulating material such as a phenol condensation product, which may take the form of Bakelite.

In the Bowers patent referred to, the connection between the inner and outer parts of the holder is more or less permanent, being established by welding. The present invention proposes an improvement in this respect by providing a detachable connection between the inner and outer parts of the holder. Another highly important object of the invention is the provision of a filter glass holder of the character aforesaid, which includes a novel snap connection between the inner and outer holder parts.

In attaining this end the inner faces of the side walls of the outer part are formed with inwardly projecting lugs. Cooperating with these lugs are complemental openings in leaf spring elements which are anchored to the inner holder part and which, of course, pass through the window opening. Through the medium of these spring elements, the edges of the mask about the window opening are clamped between the holder parts.

Various other more detailed objects and advantages of the invention such as arise in connection with carrying out the above noted objectives in a practical embodiment will in part become apparent, and in part be hereinafter stated, as the description of the invention proceeds.

The invention, therefore, comprises a filter glass holder including inner and outer holder parts made from non-metallic insulating material such as Bakelite and which are assembled with the edges of the mask about the window opening clamped between the holder parts by means of recessed leaf spring elements that are anchored to the inner holder part and extend through the window opening to snap over lugs on the outer holder part.

For a full and more complete understanding of the invention reference may be had to the following description and accompanying drawing, wherein Figure 1 is a sectional view through the holder parts and a portion of the mask with these elements shown in an exploded relation, Figure 2 is an enlarged detailed fragmentary showing of the holder assembled on the mask. In this view certain parts are shown in section and others in elevation, Figure 3 is a detailed showing partly in section and partly in elevation of the outer holder part per se, and Figure 4 is a view showing one of the leaf springs in elevation.

Referring now to the drawing, wherein like reference characters denote corresponding parts, and first more particularly to Figure 1, the mask of the welding helmet is identified as A and is shown as being of the usual curved formation. The mask A may be made from any suitable material such as a fibre composition in accordance with well established practice. The mask A is formed with a window opening shown at 10 and it is about the edges of this window opening 10 that the filter glass holder is assembled.

The filter glass holder of this invention comprises the inner part referred to in its entirety by the reference character B and the outer part designated C.

At this point it is well to note that this invention is concerned primarily with the manner in which the two holder parts B and C are assembled on the mask A. Other old and well known features of the holder, such as those having to do with the positioning of the ray filter and its protective glasses are not herein shown as they are not a part of the improvements provided by this invention.

The inner holder part B may be made from any good insulating material although the use of a phenol condensation product such as Bakelite is preferred. The inner part of the holder B is formed with a peripheral flange 11 that engages the inner face of the mask A. The bead 12 projects from the flange 11 and into the window opening 10. With the flange 11 engaging the inner face of the mask A and the bead 12 within the window opening 10, the inner holder part B is properly positioned.

Referring for the moment to Figure 4, the leaf spring element is shown as a plate 13 which may be made from any material having the properties required for a spring. This plate 13 is formed with lug openings 14 and anchorage openings 15. These anchorage openings 15 are formed along one edge of the plate 13 so that when this edge of the plate is embedded in the bead 12 the material of the bead will pass through the openings and effect a secure and permanent anchorage. Obviously this anchorage between the plate 13 and the bead 12 is established during the molding and while the Bakelite is still plastic.

The outer holder part C is preferably made from a material corresponding to the inner part B. This outer part C includes a peripheral flange 16 that engages the outer face of the mask A at the edges of the window opening 10. Outstanding from the flange 16 are side walls 17 and projecting inwardly from these side walls 17 are lugs 18. The lugs 18 on each side wall are spaced apart in a manner corresponding to the spacing of the openings 14 and are complemental thereto.

While the mode of assembly of the holder parts B and C to the mask A is believed to be obvious, it may be briefly outlined by noting that the assembled condition is attained by merely moving the holder parts B and C towards each other with the leaf spring elements 13 passing through the window opening 10. When the point is reached that the mask A is compressed between the flanges 11 and 16 the spring plates 13 will snap over the lugs 18 and these lugs will be received in the openings 14. It is notable that each of the lugs 18 has an abrupt face 19 which engages the edge of the opening 14 remote from the anchorage of the plate. Each of these lugs 18 also has a gradually inclined face 20 over which these springs may ride up to the point that they snap into position in which the faces 19 are engaged with corresponding edges of the openings 14.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

What is claimed is:

1. In a welding helmet having a mask formed with a window opening, a filter glass holder comprising inner and outer non-metallic holder parts engaging the inner and outer faces of the mask about the window opening, and snap means for establishing a detachable connection between said holder parts to maintain the assembled relation of said holder parts and mask.

2. In a welding helmet of the character described, a filter glass holder comprising an inner holder part of insulating material, a leaf spring anchored to said inner holder part, an outer holder part of insulating material and means carried by said outer holder part adapted for cooperation with said spring to establish a connection between said holder parts.

3. In a welding helmet having a mask formed with a window opening, a filter glass holder comprising an inner holder part of insulating material and including a peripheral mask engaging flange and a bead adapted to be positioned in said window opening, a pair of leaf spring elements each having edges anchored to said inner holder part in said bead, each of said springs also being formed with lug openings, an outer holder part of insulating material and including a mask engaging flange and side walls, and lugs on the inner face of each of said side walls, said lugs being received in said lug openings.

4. In a welding helmet of the character described, a filter glass holder comprising an inner holder part, a connecting element anchored to said inner holder part and formed with a lug opening, an outer holder part, and a lug on said outer holder part complementing said opening to provide a connection between said holder parts.

5. In a welding helmet of the character described, a filter glass holder comprising an inner holder part, a leaf spring anchored to said inner holder part and formed with a lug opening, an outer holder part, and a lug on said outer holder part complementing said opening to provide a connection between said holder parts.

6. In a welding helmet having a mask formed with a window opening, a filter glass holder comprising an inner holder part including a peripheral mask engaging flange and a bead adapted to be positioned in said window opening, a pair of leaf spring elements each having edges anchored to said inner holder part in said bead, each of said springs also being formed with lug openings, an outer holder part including a mask engaging flange and side walls, and lugs on the inner face of each of said side walls, said lugs being received in said lug openings.

EDMOND B. MAILLART.